US011390243B2

(12) United States Patent
Ouyang et al.

(10) Patent No.: US 11,390,243 B2
(45) Date of Patent: Jul. 19, 2022

(54) METHOD AND APPARATUS FOR PROCESSING VEHICLE COLLISION, VEHICLE, DEVICE AND STORAGE MEDIUM

(71) Applicant: Apollo Intelligent Driving Technology (Beijing) Co., Ltd., Beijing (CN)

(72) Inventors: Wei Ouyang, Beijing (CN); Yongyi Sun, Beijing (CN); Peng Zhang, Beijing (CN); Dan Chen, Beijing (CN); Chengfa Wang, Beijing (CN); Yue Wang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 272 days.

(21) Appl. No.: 16/678,102

(22) Filed: Nov. 8, 2019

(65) Prior Publication Data

US 2020/0148160 A1 May 14, 2020

(30) Foreign Application Priority Data

Nov. 9, 2018 (CN) .......................... 201811333563.7

(51) Int. Cl.
*B60R 21/34* (2011.01)
*B60R 21/0136* (2006.01)
(Continued)

(52) U.S. Cl.
CPC .......... *B60R 21/34* (2013.01); *B60R 21/0136* (2013.01); *B60T 7/22* (2013.01); *B60R 2021/0027* (2013.01); *B60R 2021/346* (2013.01)

(58) Field of Classification Search
CPC ................ B60R 21/34; B60R 21/0136; B60R 2021/0027; B60R 2021/346; B60T 1/14; B60W 30/08; B60W 10/18
See application file for complete search history.

(56) References Cited

U.S. PATENT DOCUMENTS

2004/0102883 A1* 5/2004 Sala .................... B60R 21/0136
701/46
2015/0145236 A1 5/2015 Park et al.

FOREIGN PATENT DOCUMENTS

CN 202320190 U 7/2012
CN 202987104 U 6/2013
(Continued)

*Primary Examiner* — Michael J Zanelli
(74) *Attorney, Agent, or Firm* — Harness, Dickey & Pierce, P.L.C.

(57) ABSTRACT

The present disclosure provides a method and an apparatus for processing a vehicle collision, a vehicle, a device and a storage medium. The method includes: obtaining vehicle state information of a target vehicle; the vehicle state information includes: acceleration information of the target vehicle and/or pressure information of a peripheral part in the target vehicle; determining whether a collision occurs to the target vehicle; sending, when it is determined that the collision occurs to the target vehicle, an ejection instruction is sent to an ejection execution mechanism in the target vehicle, the ejection instruction is used to instruct to eject a baffle located at a target position to contact the ground. The baffle is ejected immediately when the present disclosure detects that a collision occurs to the vehicle, which can avoid a secondary collision of the vehicle, thereby improving the safety performance of the vehicle.

14 Claims, 4 Drawing Sheets

Obtain vehicle state information of a target vehicle; where the vehicle state information includes: information about acceleration of the target vehicle and/or information about pressure on the peripheral part in the target vehicle — S201

Input the vehicle state information into a preset calibration model to obtain a calibration result — S2021

Determine, according to the calibration result, whether a collision occurs to the target vehicle — S2022

Send, when it is determined that the collision occurs to the target vehicle, an ejection instruction to an ejection execution mechanism in the target vehicle, where the ejection instruction is used to instruct to eject a baffle located at a target position to contact the ground — S203

(51) Int. Cl.
 *B60T 7/22* (2006.01)
 *B60R 21/00* (2006.01)

(56) References Cited

FOREIGN PATENT DOCUMENTS

| | | | | |
|---|---|---|---|---|
| CN | 204452049 U | 7/2015 | | |
| CN | 105059228 A | * 11/2015 | | |
| CN | 105083185 A | * 11/2015 | | |
| CN | 105150968 A | * 12/2015 | | |
| CN | 105150975 A | * 12/2015 | | |
| CN | 205632438 U | 10/2016 | | |
| CN | 108705985 A | * 10/2018 | | |
| DE | 10002124 A1 | * 7/2000 | ................ | B60T 1/14 |
| GB | 2539984 A | * 1/2017 | ............. | B60R 19/40 |
| JP | 2004017664 A | 1/2004 | | |
| JP | 2005132295 A | 5/2005 | | |
| JP | 2006044325 A | 2/2006 | | |
| JP | 2007022337 A | 2/2007 | | |
| JP | 2007296941 A | 11/2007 | | |
| JP | 2008080869 A | 4/2008 | | |
| JP | 2008171276 A | 7/2008 | | |
| JP | 2015528580 A | 9/2015 | | |
| KR | 20150060146 A | 6/2015 | | |
| WO | 2004031009 A1 | 4/2004 | | |
| WO | WO-2019165617 A1 | * 9/2019 | ........... | G07C 5/0808 |

\* cited by examiner

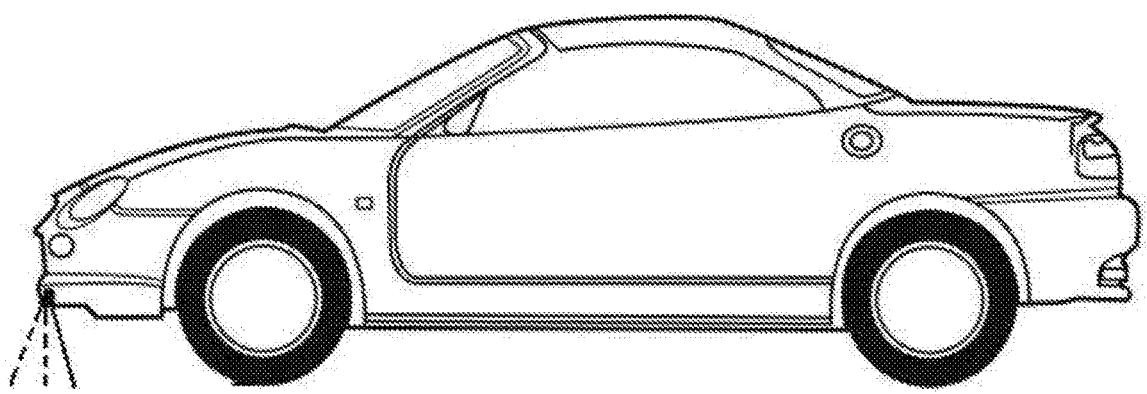

FIG. 2c

```
Obtain vehicle state information of a target vehicle; where the vehicle state
information includes: information about acceleration of the target vehicle    — S201
and/or information about pressure on the peripheral part in the target vehicle

↓

Input the vehicle state information into a preset calibration model            — S2021
           to obtain a calibration result

↓

Determine, according to the calibration result,                                — S2022
whether a collision occurs to the target vehicle

↓

Send, when it is determined that the collision occurs to the target vehicle, an
ejection instruction to an ejection execution mechanism in the target vehicle, — S203
where the ejection instruction is used to instruct to eject a baffle located
         at a target position to contact the ground
```

FIG. 3

METHOD AND APPARATUS FOR PROCESSING VEHICLE COLLISION, VEHICLE, DEVICE AND STORAGE MEDIUM

CROSS-REFERENCE TO RELATED APPLICATION

This application claims priority to Chinese Patent Application No. 201811333563.7, filed on Nov. 9, 2018, which is hereby incorporated by reference in its entirety.

TECHNICAL FIELD

The present disclosure relates to the technical field of vehicle safety protection, and in particular, to a method and apparatus for processing a vehicle collision, a vehicle, a device and a storage medium.

BACKGROUND

At present, when the control system of the autonomous vehicle fails or does not work, the autonomous vehicle is out of control and will continue moving forward or backward. However, in a practical application scenario, especially when the autonomous vehicle (such as an internal shuttle bus of the park or an autonomous logistics vehicle in the park) is driving at a low speed, the damage like crushing caused by the continuous forward/backward moving is even more serious than consequences of the collision itself.

Therefore, there is an urgent need for a method for processing a vehicle collision that can avoid a secondary accident of the vehicle after the vehicle collision.

SUMMARY

The present disclosure provides a method and an apparatus for processing a vehicle collision, a vehicle, a device and a storage medium, to avoid a secondary accident of the vehicle after a collision has occurred, thereby improving the safety performance of the vehicle.

In a first aspect, the present disclosure provides a method for processing a vehicle collision, including:

obtaining vehicle state information of a target vehicle; where the vehicle state information includes: acceleration information of the target vehicle and/or pressure information of a peripheral part in the target vehicle;

determining, according to the vehicle state information, whether a collision occurs to the target vehicle; and when it is determined that the collision occurs to the target vehicle, sending an ejection instruction to an ejection execution mechanism in the target vehicle, where the ejection instruction is used to instruct to eject a baffle located at a target position to contact the ground.

In an implementation, the obtaining vehicle state information of a target vehicle includes:

obtaining, by a sensor on the target vehicle, the vehicle state information.

In an implementation, the determining, according to the vehicle state information, whether a collision occurs to the target vehicle includes:

inputting the vehicle state information into a preset calibration model to obtain a calibration result; and determining, according to the calibration result, whether the collision occurs to the target vehicle.

In an implementation, the peripheral part of the target vehicle includes at least one of a front bumper, a rear bumper, and other peripheral parts of the target vehicle.

In an implementation, the target position includes: a front bumper, a left front wheel and/or a right front wheel of the target vehicle.

In an implementation, the baffle is made of a soft material.

In an implementation, when it is determined that the collision occurs to the target vehicle, the method further includes:

sending a brake instruction to a brake system in the target vehicle, and/or sending a non-acceleration instruction to a throttle in the target vehicle, where the brake instruction is used to instruct the target vehicle to brake, and the non-acceleration instruction is used to instruct the throttle to stop refueling.

In a second aspect, the present disclosure provides an apparatus for processing a vehicle collision, including:

an obtaining module, configured to obtain vehicle state information of a target vehicle; where the vehicle state information includes: acceleration information of the target vehicle and/or pressure information of a peripheral part in the target vehicle;

a determining module, configured to determine, according to the vehicle state information, whether a collision occurs to the target vehicle; and a sending module, configured to send, when it is determined that the collision occurs to the target vehicle, an ejection instruction to an ejection execution mechanism in the target vehicle, where the ejection instruction is used to instruct to eject a baffle located at a target position to contact the ground.

In an implementation, the obtaining module is specifically configured to obtain, by a sensor on the target vehicle, the vehicle state information.

In an implementation, the determining module is specifically configured to input the vehicle state information into a preset calibration model to obtain a calibration result, and determine, according to the calibration result, whether the collision occurs to the target vehicle.

In an implementation, the peripheral part of the target vehicle includes at least one of a front bumper, a rear bumper, and other peripheral parts of the target vehicle.

In an implementation, the target position includes: a front bumper, a left front wheel and/or a right front wheel of the target vehicle.

In an implementation, the baffle is made of a soft material.

In an implementation, the sending module is further configured to send a brake instruction to a brake system in the target vehicle, and/or send a non-acceleration instruction to a throttle in the target vehicle, where the brake instruction is used to instruct the target vehicle to brake, and the non-acceleration instruction is used to instruct the throttle to stop refueling.

In a third aspect, the present disclosure provides a vehicle, including an apparatus for processing a vehicle collision, as described in the second aspect.

In a fourth aspect, the present disclosure provides a computer readable storage medium, having stored thereon a computer program, where the computer program is executed by a processor to implement the method for processing a vehicle collision of the first aspect.

In a fifth aspect, the present disclosure provides an electronic device, including:

a processor; and a memory, configured to store executable instructions of the processor;

where the processor is configured to perform the method for processing a vehicle collision of the first aspect by executing the executable instructions.

In the method and apparatus for processing a vehicle collision, vehicle, device and storage medium provided by the present disclosure, it is determined whether a collision occurs to a target vehicle by obtaining vehicle state information of the target vehicle in real time, where the vehicle state information includes acceleration information of the target vehicle and/or pressure information of the peripheral part in the target vehicle, and then by monitoring the state of the target vehicle in real time according to the vehicle state information; when it is determined that the collision occurs to the target vehicle, an ejection instruction can be sent to an ejection execution mechanism in the target vehicle, in accordance with the ejection instruction, a baffle located at a target position is ejected to contact the ground. The setting of the baffle can greatly lower the speed of the target vehicle, and then finally stop the low-speed target vehicle, so as to avoid a secondary collision after a collision has occurred to the target vehicle and to further prevent more serious traffic accidents such as involving and crushing a pedestrian underneath the vehicle, thereby improving the safety performance of the vehicle after the collision.

BRIEF DESCRIPTION OF THE DRAWINGS

In order to more clearly illustrate the technical solutions in the embodiments of the present application or in the prior art, a brief introduction to the drawings used for describing the embodiments or the prior art will be made below. Obviously, the drawings in the following description show some embodiments of the present disclosure, and those skilled in the art may still derive other drawings from these drawings without any creative effort.

FIG. 2c is a schematic diagram showing a final state of an ejected baffle according to the present disclosure FIG. 3 is a flowchart of a method for processing a vehicle collision according to the present disclosure;

DESCRIPTION OF EMBODIMENTS

To make the purposes, technical solutions and advantages of the present application clearer, the technical solutions of the present application will be clearly and completely described below with reference to the drawings of the present application. Apparently, the described embodiments are some rather than all of the embodiments according to the present application. All other embodiments obtained by a person of ordinary skill in the art based on the embodiments of the present application without creative efforts fall within the protection scope of the present disclosure.

The present embodiment provides a method and apparatus for processing a vehicle collision, a vehicle, a device and a storage medium that are applicable to the technical field of vehicle driving. The method for processing a vehicle collision of the present embodiment may be performed by a server or by a vehicle terminal having a driving application installed thereon.

In this case, the server may be a server that controls the collision processing of the vehicle in the vehicle terminal, or may be other servers for controlling the collision processing of the vehicle. The vehicle terminal may be an in-vehicle terminal device installed on the vehicle at the time of exfactory, or may be the vehicle terminal device installed on the vehicle in an external coupling manner, or may be an electronic device located on the vehicle.

In this case, the vehicle or the vehicle terminal can establish a wireless connection with the server through the mobile communication network. The mobile communication network may include, but is not limited to, any one of 3G, 4G and 5G. There may be a mobile communication module on the vehicle or on the vehicle terminal in the vehicle for establishing a connection with the server and then communicating with each other.

Hereinafter, by taking a vehicle terminal as an example, a specific implementation process of the method for processing a vehicle collision will be described in detail through specific embodiments.

Figure 1:
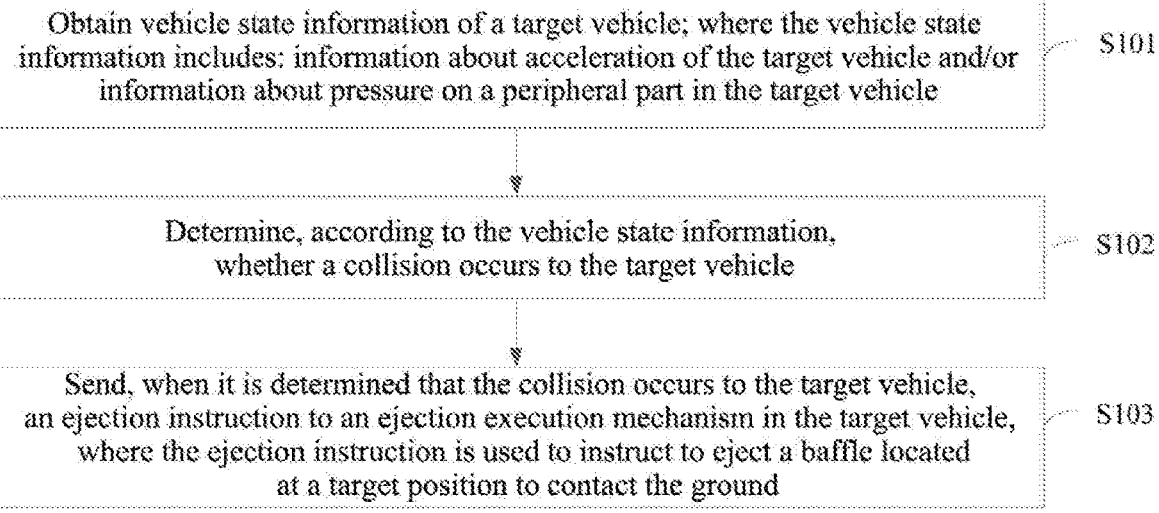
FIG. 1 is a flowchart of a method for processing a vehicle collision according to the present disclosure.

FIG. 1 is a flowchart of a method for processing a vehicle collision according to the present disclosure. As shown in FIG. 1, the method for processing a vehicle collision according to the present embodiment may include:

S101, obtain vehicle state information of a target vehicle; where the vehicle state information includes: acceleration information of the target vehicle and/or pressure information of a peripheral part in the target vehicle.

Specifically, the vehicle terminal can monitor the vehicle state information of the target vehicle in real time, where the specific manner in which the vehicle terminal obtains the vehicle state information is not limited in the present embodiment. For example, a monitoring device (such as a gyroscope) or one or more sensors (such as a pressure sensor) may be installed on the target vehicle, and the vehicle state information may be obtained by the vehicle terminal through connection with the monitoring device and the sensor. For another example, the sensor on the target vehicle uploads the collected data to other devices on the vehicle, and the vehicle terminal may also obtain the vehicle state information through connection with said other devices.

In this case, the vehicle state information may include, but is not limited to, information about vehicle speed, acceleration information, pressure information of the peripheral part, and etc. of the target vehicle, where the peripheral part of the target vehicle includes at least one of a front bumper, a rear bumper, and other peripheral parts of the target vehicle.

S102, determine, according to the vehicle state information, whether a collision occurs to the target vehicle.

Specifically, the vehicle terminal may monitor acceleration information of the target vehicle and/or pressure information of the peripheral part in the target vehicle, and further, the vehicle terminal may monitor the current state of the target vehicle according to the vehicle state information, so as to timely control the vehicle to take the appropriate action. In particular, the vehicle terminal may detect whether a collision occurs to the target vehicle according to the acceleration information of the target vehicle and/or the pressure information of the peripheral part in the target vehicle.

S103, send, when it is determined that the collision occurs to the target vehicle, an ejection instruction to an ejection execution mechanism in the target vehicle, where the ejection instruction is used to instruct to eject a baffle located at a target position to contact the ground.

Specifically, the target vehicle is also provided with a baffle that not only prevents the target vehicle from continuing moving after a collision has occurred, but also avoids more serious traffic accidents such as involving a pedestrian underneath the vehicle and crushing the same. In the present embodiment, the baffle may be hung at the target position, or may be hidden in the space at the target position, and the manner in which the baffle is connected to the target vehicle is not limited in the present embodiment.

In this case, the target position may include, but is not limited to, positions that may stop the target vehicle from continuing moving, such as a front bumper, a left front wheel, and/or a right front wheel of the target vehicle. Moreover, the size, material and quantity of the baffle located at the target position are not limited in the present embodiment, as long as the baffle located at the target position can contact the ground.

In an implementation, the baffle is made of a soft material, so that the baffle of the soft material may not only prevent the target vehicle from continuing moving, but also may prevent the pedestrian from getting involved and crushed underneath the target vehicle, and further, may prevent the pedestrian from getting hurt in case that the baffle is of a harder material.

Further, when the terminal device determines that a collision occurs to the target vehicle, the terminal device can stop the target vehicle by means of the setting of the baffle, so as to avoid a secondary accident, such as another collision of the target vehicle after a collision has occurred. Specifically, the terminal device may send an ejection instruction to an ejection execution mechanism in the target vehicle, where the ejection instruction can be used to instruct to eject a baffle.

Figure 2A:
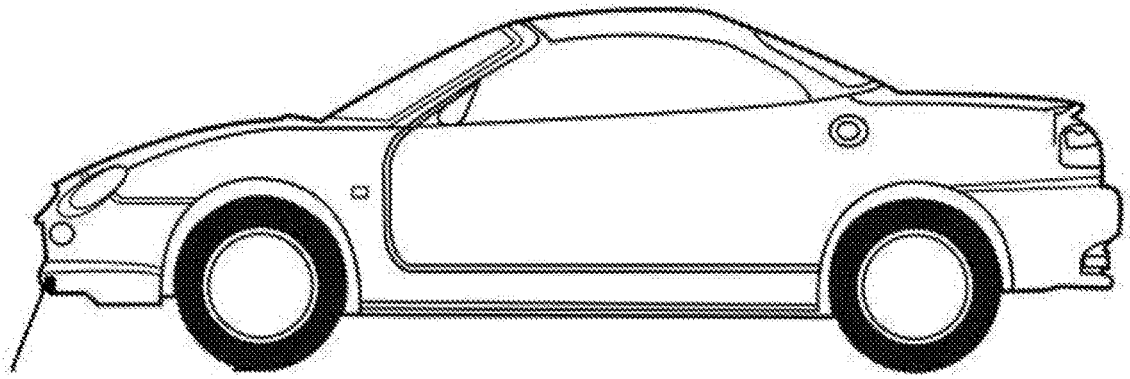
FIG. 2a is a schematic diagram showing an initial state of an ejected baffle according to the present disclosure.
Figure 2B:
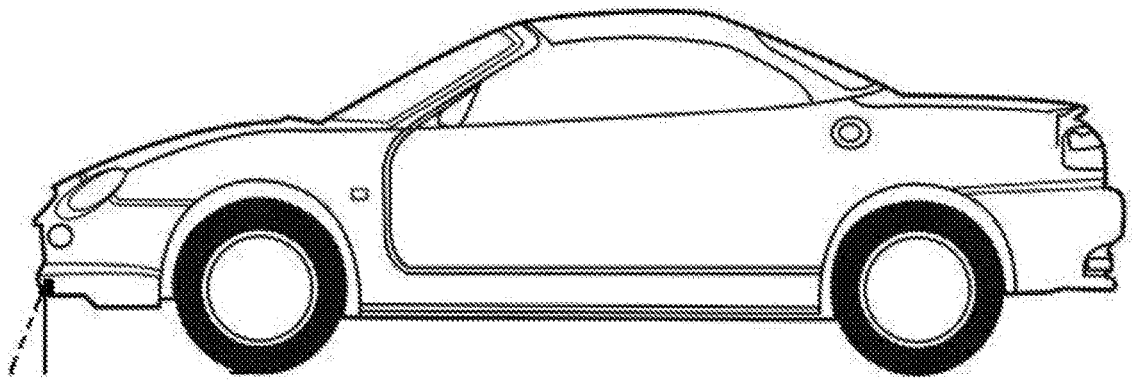
FIG. 2b is a schematic diagram showing an intermediate state of an ejected baffle according to the present disclosure.

In a specific embodiment, a baffle can be provided on the front bumper of the target vehicle, as shown in FIG. 2a. When the vehicle terminal determines that a collision occurs to the target vehicle, the vehicle terminal may send an ejection instruction to the ejection execution mechanism, and the baffle is then ejected in accordance with the ejection instruction, as shown in FIG. 2b. Since the target vehicle is still moving, the baffle is in the state shown in FIG. 2c. Accordingly, the baffle provides a reverse resistance to the target vehicle to prevent the target vehicle from continuing moving, which can lower the speed of the target vehicle, and stop the target vehicle from moving. Especially in a case where a collision occurs to a target vehicle and the target vehicle travels at a low speed, the target vehicle is likely to stop directly, so as to avoid a secondary collision of the target vehicle; since the baffle contacts the ground, the setting of the baffle may also prevent the pedestrian from getting involved and crushed underneath the vehicle, thereby avoiding more serious traffic accidents.

In the method for processing a vehicle collision according to the present embodiment, it is determined whether a collision occurs to a target vehicle by obtaining vehicle state information of the target vehicle in real time, where the vehicle state information includes acceleration information of the target vehicle and/or pressure information of the peripheral part in the target vehicle, and then by monitoring the state of the target vehicle in real time according to the vehicle state information; when it is determined that the collision occurs to the target vehicle, an ejection instruction is sent to an ejection execution mechanism in the target vehicle, in accordance with the ejection instruction, a baffle located at a target position is ejected to contact the ground. The setting of the baffle can greatly lower the speed of the target vehicle, and then finally stop the low-speed target vehicle, so as to avoid a secondary collision after a collision has occurred to the target vehicle and to further prevent more serious traffic accidents such as involving and crushing a pedestrian underneath the vehicle, thereby improving the safety performance of the vehicle after the collision.

Based on the above embodiment, a specific process for determining whether a collision occurs to the target vehicle according to the vehicle state information of S102 in FIG. 1 will be described in detail with reference to FIG. 3. FIG. 3 is a flowchart of a method for processing a vehicle collision according to the present disclosure. As shown in FIG. 3, the method for processing a vehicle collision of the present embodiment may include:

S201, obtain vehicle state information of a target vehicle; where the vehicle state information includes: acceleration information of the target vehicle and/or pressure information of the peripheral part in the target vehicle.

In this case, the S201 is similar to the implementation of the S101 in the embodiment of FIG. 1, and will not be repeated in the present embodiment.

S2021, input the vehicle state information into a preset calibration model to obtain a calibration result.

S2022, determine, according to the calibration result, whether a collision occurs to the target vehicle.

Specifically, since the state of the vehicle corresponds to the vehicle state information, the terminal device can collect vehicle state information of each state of the target vehicle, and train the vehicle state information and the state of the vehicle. The characteristic information of various states of the vehicle can be calibrated, such that the terminal device can obtain the preset calibration model of the target vehicle in a collision.

In this case, the characteristic information of the vehicle in various states may include, but is not limited to, information such as the vehicle speed, the pressure on the peripheral part or the pressure difference thereof, and the acceleration, and the specific form of the characteristic information is not limited in the present embodiment. For the preset calibration model, a Deep Convolutional Neural Networks structure may be adopted, including but not limited to object detection models such as Regions with CNN features (RCNN), Single Shot MultiBox Detector (SSD), Mask RCNN, as well as other image segmentation models.

It should be noted that as for the specific implementation process of obtaining neural network model by the terminal based on the principle of the deep convolutional neural network structure in the present embodiment, reference may be made to the prior art, which will not be repeated herein. Moreover, the vehicle terminal may also receive the preset calibration model trained by other terminals or servers.

Further, the vehicle terminal may input the obtained vehicle state information into the preset calibration model, and the preset calibration model may analyze the vehicle state information and output a calibration result. Further, the vehicle terminal may determine whether a collision occurs to the target vehicle according to the calibration result, so as to accurately distinguish different states of the target vehicle, and to prevent the vehicle terminal from erroneously sending an ejection instruction to the ejection execution mechanism and a result of false triggering.

In addition, the vehicle terminal may also directly calibrate the correspondence between the state of the vehicle and the vehicle state information, to obtain a calibration relationship between the state of the vehicle and the vehicle state information. Further, the vehicle terminal may determine, according to the obtained vehicle state information and the calibration relationship, the state of the vehicle, thereby determining whether a collision occurs to the target vehicle.

S203, send, when it is determined that the collision occurs to the target vehicle, an ejection instruction to an ejection execution mechanism in the target vehicle, where the ejection instruction is used to instruct to eject a baffle located at a target position to contact the ground.

In this case, the S203 is similar to the implementation of the S103 in the embodiment of FIG. 1, which will not be repeated in the present embodiment.

Figure 4:
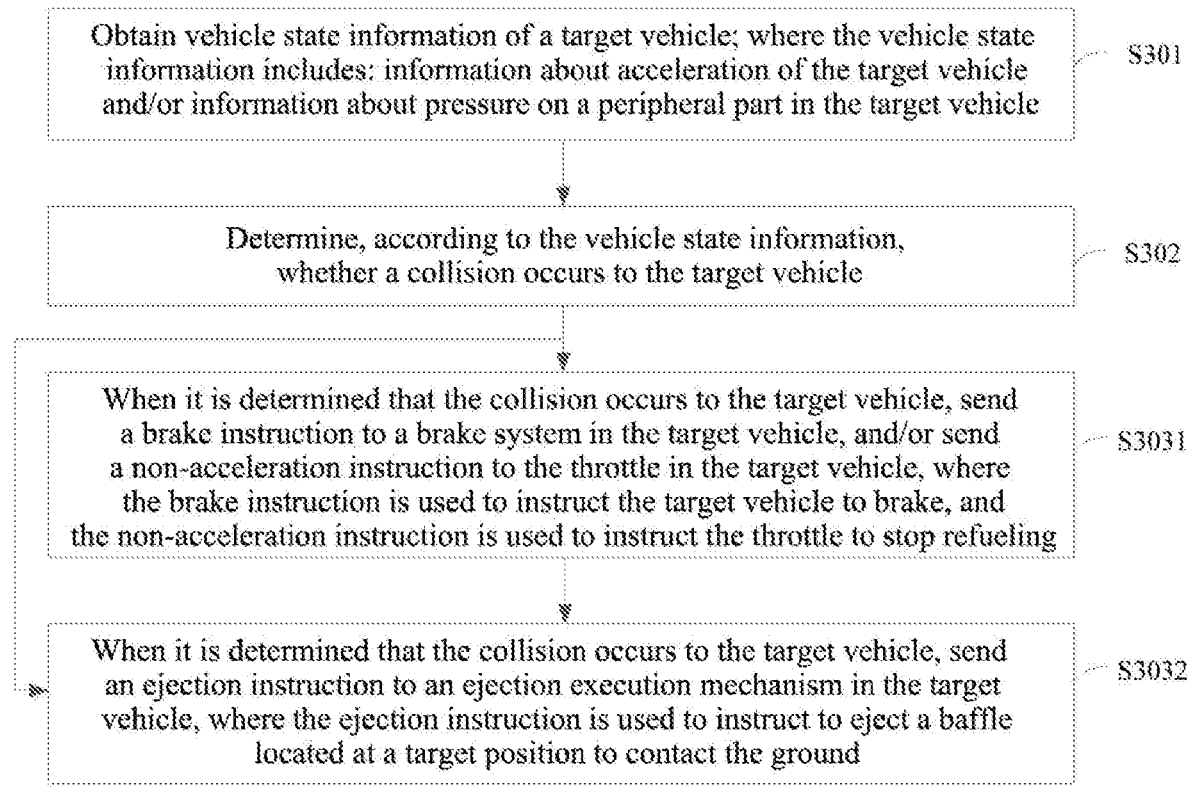
FIG. 4 is a flowchart of a method for processing a vehicle collision according to the present disclosure.

Based on the above embodiment, a specific process of the method for processing a vehicle collision of the present embodiment will be described in detail with reference to FIG. 4. FIG. 4 is a flowchart of a method for processing a vehicle collision according to the present disclosure. As shown in FIG. 4, the method for processing a vehicle collision of the present embodiment may include:

S301, obtain vehicle state information of a target vehicle; where the vehicle state information includes: acceleration information of the target vehicle and/or pressure information of a peripheral part in the target vehicle.

S302, determine, according to the vehicle state information, whether a collision occurs to the target vehicle.

In this case, implementations of the S301 and the S302 are similar to those of the S101 and S102 in the embodiment in FIG. 1, and will not be repeated in the present embodiment.

S3031, when it is determined that the collision occurs to the target vehicle, send a brake instruction to a brake system in the target vehicle, and/or send a non-acceleration instruction to the throttle in the target vehicle, where the brake instruction is used to instruct the target vehicle to brake, and the non-acceleration instruction is used to instruct the throttle to stop refueling.

Specifically, when the vehicle terminal determines that a collision occurs to the target vehicle, the terminal device may send a brake instruction to the brake system in the target vehicle, to control the brake system to brake the target vehicle, or may send a non-acceleration instruction to a throttle in the target vehicle to instruct the throttle to stop refueling, such that the target vehicle cannot continue moving, and may also simultaneously send the brake instruction to the brake system in the target vehicle and send the non-acceleration instruction to the throttle, thereby braking the target vehicle under the dual effects, and avoiding the secondary accident of the target vehicle due to the continuation of moving.

Further, there is a case where the vehicle terminal sends a brake instruction to the brake system in the target vehicle and the brake system fails, the target vehicle cannot brake. And there is also a case where the vehicle terminal sends a non-acceleration instruction to the throttle in the target vehicle and the non-acceleration instruction has a logic error, the throttle fails to respond to the non-acceleration instruction and continues refueling, so that the target vehicle cannot brake. When any one of the above cases occurs, and the vehicle terminal determines that a collision occurs to the target vehicle, the vehicle terminal may adopt the specific manner of the S3032 to directly stop the target vehicle from continuing moving by means of the baffle, thereby avoiding a secondary accident of the target vehicle.

S3032, when it is determined that the collision occurs to the target vehicle, send an ejection instruction to an ejection execution mechanism in the target vehicle, where the ejection instruction is used to instruct to eject a baffle located at a target position to contact the ground.

In this case, the implementation of S3032 is similar to that of the S103 in the embodiment in FIG. 1, and will not be repeated in the present embodiment.

Figure 5:
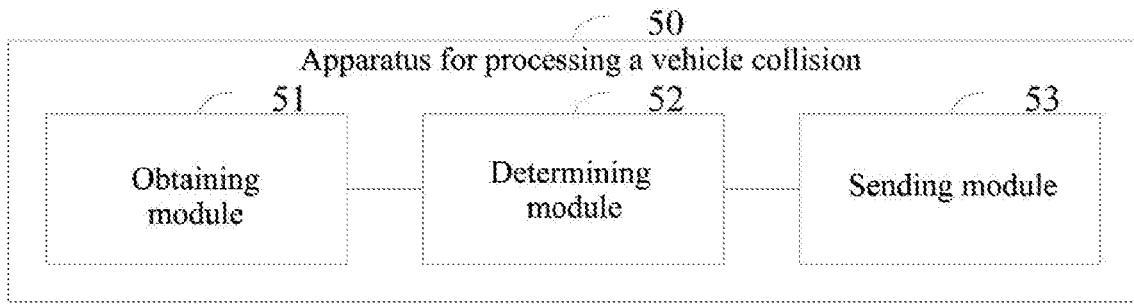
FIG. 5 is a schematic structural diagram of an apparatus for processing a vehicle collision according to the present disclosure.

FIG. 5 is a schematic structural diagram of an apparatus for processing a vehicle collision according to the present disclosure. As shown in FIG. 5, the apparatus 50 for vehicle collision processing of the present embodiment includes:

an obtaining module 51, configured to obtain vehicle state information of a target vehicle; where the vehicle state information includes: acceleration information of the target vehicle and/or pressure information of a peripheral part in the target vehicle;

a determining module 52, configured to determine, according to the vehicle state information, whether a collision occurs to the target vehicle;

a sending module 53, configured to send, when it is determined that a collision occurs to the target vehicle, an ejection instruction to an ejection execution mechanism in the target vehicle, where the ejection instruction is used to instruct to eject a baffle located at a target position to contact the ground.

In an implementation, the obtaining module 51 is specifically configured to obtain, by a sensor on the target vehicle, the vehicle state information.

In an implementation, the determining module 52 is specifically configured to input the vehicle state information into a preset calibration model to obtain a calibration result, and determine, according to the calibration result, whether a collision occurs to the target vehicle.

In an implementation, the peripheral part of the target vehicle includes: at least one of a front bumper, a rear bumper, and other peripheral parts of the target vehicle.

In an implementation, the target position includes: a front bumper, a left front wheel and/or a right front wheel of the target vehicle.

In an implementation, the baffle is made of a soft material.

In an implementation, the sending module 53 is further configured to send a brake instruction to a brake system in the target vehicle, and/or send a non-acceleration instruction to a throttle in the target vehicle, where the brake instruction is used to instruct the target vehicle to brake, and the non-acceleration instruction is used to instruct the throttle to stop refueling.

The apparatus for processing a vehicle collision according to the embodiment of the present disclosure may perform the above embodiments of the method for processing a vehicle collision, and as for the specific implementation principle and technical effects thereof, reference can be made to the preceding method embodiment, which will not be repeated in the present embodiment.

In the present disclosure, the function modules of the apparatus for processing the vehicle collision may be divided according to the above example method. For example, the each function module may be divided according to each function, alternatively two or more functions may be integrated into one processing module. The above integrated module can be implemented in the form of hardware or in the form of the software functional module. It should be noted that division of the modules in the embodiments of the present disclosure is merely illustrative and a division in terms of logical functions, and there may be other division manners in the actual implementation.

Figure 6:
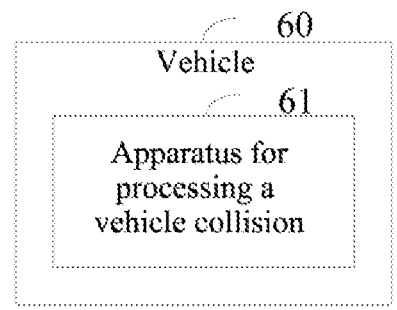
FIG. 6 is a schematic structural diagram of a vehicle according to the present disclosure.

FIG. 6 is a schematic structural diagram of a vehicle according to the present disclosure. As shown in FIG. 6, the vehicle 60 of the present embodiment includes: an apparatus 61 for processing vehicle collision as shown in FIG. 5.

The vehicle provided by the embodiment of the present disclosure includes an apparatus for processing a vehicle collision that may perform above embodiments of the method for processing a vehicle collision, and as for the specific implementation principle and technical effects thereof, reference can be made to the preceding method embodiment, which will not be repeated in the present embodiment.

Figure 7:
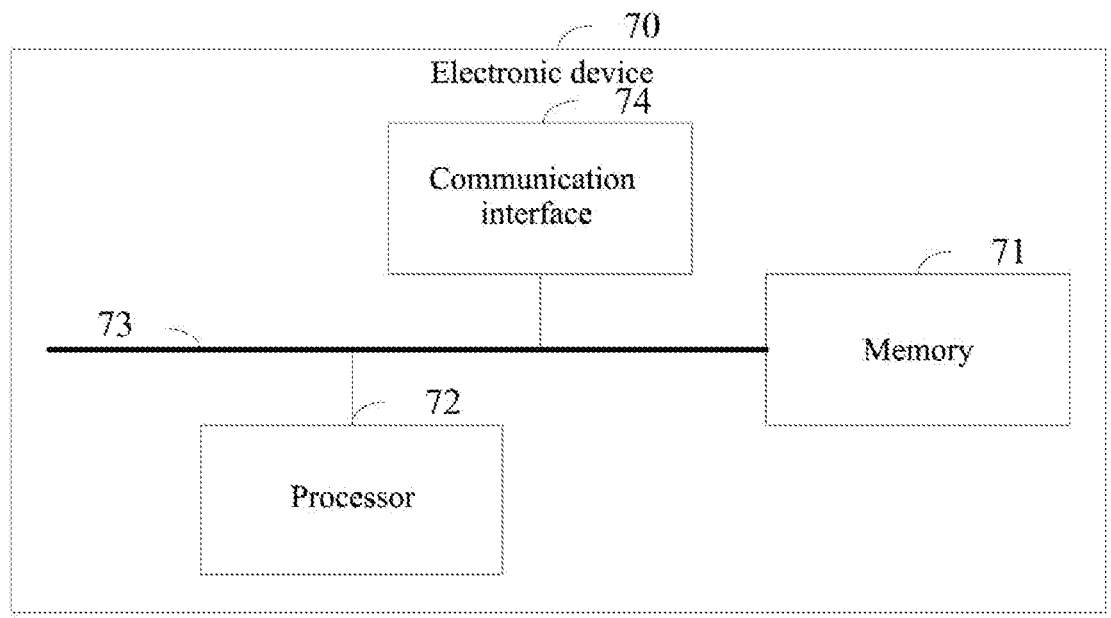
FIG. 7 is a schematic structural diagram of hardware of an electronic device according to the present disclosure.

FIG. 7 is a schematic structural diagram of hardware of an electronic device according to the present disclosure. As shown in FIG. 7, the electronic device 70 is configured to implement the operation corresponding to the vehicle terminal in any one of the preceding method embodiments, and the electronic device 70 of the present embodiment may include: a memory 71 and a processor 72;

the memory 71 is configured to store a computer program;

the processor 72 is configured to execute the computer program stored in the memory, so as to implement the method for processing a vehicle collision in the above embodiments. Reference can be made to the related description in the preceding method embodiments for details.

In an implementation, the memory 71 may be either separate, or be integrated together with the processor 72.

When the memory 71 is a device independent of the processor 72, the electronic device 70 may further include:

a bus 73, configured to connect the memory 71 and the processor 72.

In an implementation, the present embodiment further includes: a communication interface 74 which may be connected to the processor 72 via the bus 73. The processor 72 may control the communication interface 74 to implement the above receiving function and sending function of the electronic device 70.

The electronic device provided in the present embodiment can be configured to perform the above method for processing a vehicle collision, and the implementation and technical effect thereof are similar to those of the above method for processing a vehicle collision, which will not be repeated in the present embodiment.

The present disclosure also provides a computer readable storage medium including a computer program for implementing the method for processing a vehicle collision in the above embodiments.

In the several embodiments provided by the present disclosure, it should be understood that the disclosed devices and methods may be implemented in other manners. For example, the device embodiments described above are merely illustrative. For example, the division of the modules is only a division in terms of logical function, and there may be another division manner in actual implementation, for example, multiple modules may be combined or integrated into another system, or some features can be ignored or not executed. In addition, the mutual coupling or direct coupling or communication connection shown or discussed may be an indirect coupling or communication connection through some interfaces, apparatuses or modules, and may be in an electrical form, mechanical form or in other forms.

The modules described as separate components may or may not be physically separated, and the component displayed as a module may or may not be a physical unit, that is, may be located in one place, or may be distributed to multiple network units. Some or all the modules may be selected as required, to achieve the purpose of the solution of the embodiment.

In addition, respective functional modules in respective embodiments of the present disclosure may be integrated into one processing unit, or each module may exist physically separately, or two or more modules may be integrated into one module. The above module-integrated module can be implemented in the form of hardware or in the form of hardware plus software functional units.

The integrated module described above implemented in the form of software functional module can be stored in a computer readable storage medium. The above software functional module is stored in a storage medium and includes instructions for causing a computer device (which may be a personal computer, a server, or a network device, etc.) or a processor to perform part of the steps of the methods according to the various embodiments of the present application.

It should be understood that the above processor may be a Central Processing Unit (CPU), or may be other general processors, a Digital Signal Processor (DSP), an Application Specific Integrated Circuit (ASIC), etc. The general processor may be a microprocessor, or the processor may be any conventional processor or the like. Steps of the method disclosed in the present disclosure may be directly embodied as being implemented by a hardware processor, or may be performed by a combination of hardware in the processor and software modules.

The memory may include a high speed RAM memory, and may also include a non-volatile memory NVM, such as at least one disk memory, and may also be a USB flash drive, a removable hard disk, a read only memory, a magnetic disk, or an optical disk.

The bus may be an Industry Standard Architecture (ISA) bus, a Peripheral Component (PCI) bus, or an Extended Industry Standard Architecture (EISA) bus. The bus can be divided into an address bus, a data bus, a control bus, and the like. For ease of indication, the bus in the drawings of the present application is not limited to only one bus or one type of bus.

The above storage medium may be implemented by any type of volatile or non-volatile storage device or by a combination thereof, such as static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk. A storage medium may be any available media that can be accessed by a general purpose or special purpose computer.

One of ordinary skill in the art will appreciate that all or part of the steps to implement each method embodiment described above may be accomplished by hardware associated with the program instructions. The above described program can be stored in a computer readable storage medium. When the program is executed, the steps including the above described method embodiments are performed; and the described storage medium includes various media that can store the program code, such as a read-only memory (ROM), a RAM, a flash memory or a hard disk.

Finally, it should be noted that the above embodiments are merely illustrative of the technical solutions of the present disclosure, and are not to be taken in a limiting sense; although the present disclosure has been described in detail with reference to the above embodiments, those skilled in the art will understand that they may still modify the technical solutions described in the above embodiments, or equivalently substitute some or all of the technical features therein; and the modifications or substitutions do not deviate the nature of the corresponding technical solutions from the scope of the technical solution of each embodiment of the present disclosure.

What is claimed is:

1. A method for processing a vehicle collision, comprising:
   obtaining vehicle state information of a target vehicle; wherein the vehicle state information comprises at least one of acceleration information of the target vehicle or pressure information of a peripheral part in the target vehicle;
   determining, according to the vehicle state information, whether a collision occurs to the target vehicle; and
   when it is determined that the collision occurs to the target vehicle, sending an ejection instruction to an ejection execution mechanism in the target vehicle, wherein the ejection instruction is used to instruct to eject a baffle located at a target position to contact the ground;
   the determining, according to the vehicle state information, whether a collision occurs to the target vehicle comprises:
   inputting the vehicle state information into a preset calibration model to obtain a calibration result; and
   determining, according to the calibration result, whether the collision occurs to the target vehicle.

2. The method according to claim 1, wherein the obtaining vehicle state information of a target vehicle comprises:
   obtaining, by a sensor on the target vehicle, the vehicle state information.

3. The method according to claim 1, wherein the peripheral part of the target vehicle comprises at least one of a front bumper, a rear bumper, or other peripheral parts of the target vehicle.

4. The method according to claim 1, wherein the target position comprises at least one of a front bumper, a left front wheel or a right front wheel of the target vehicle.

5. The method according to claim 1, wherein the baffle is made of a soft material.

6. The method according to claim 1, wherein when it is determined that the collision occurs to the target vehicle, the method further comprises at least one of the following steps
   sending a brake instruction to a brake system in the target vehicle, and sending a non-acceleration instruction to a throttle in the target vehicle, wherein the brake instruction is used to instruct the target vehicle to brake, or the non-acceleration instruction is used to instruct the throttle to stop refueling.

7. A non-transitory computer readable storage medium, having stored thereon a computer program, wherein the computer program is executed by a processor to implement the method for processing a vehicle collision according to claim 1.

8. An apparatus for processing a vehicle collision, comprising:
   a memory, a processor connected to the memory, and a computer program stored in the memory and executable on the processor, wherein,
   the computer program, when executed by the processor, causes the processor to:
   obtain vehicle state information of a target vehicle; wherein the vehicle state information comprises at least one of acceleration information of the target vehicle or pressure information of a peripheral part in the target vehicle;
   determine, according to the vehicle state information, whether a collision occurs to the target vehicle; and
   send, when it is determined that the collision occurs to the target vehicle, an ejection instruction to an ejection execution mechanism in the target vehicle, wherein the ejection instruction is used to instruct to eject a baffle located at a target position to contact the ground;
   the computer program further causes the processor to:
   input the vehicle state information into a preset calibration model to obtain a calibration result; and
   determine, according to the calibration result, whether the collision occurs to the target vehicle.

9. The apparatus according to claim 8, wherein the computer program further causes the processor to obtain, through a sensor on the target vehicle, the vehicle state information.

10. The apparatus according to claim 8, wherein the peripheral part of the target vehicle comprises at least one of a front bumper, a rear bumper, or other peripheral parts of the target vehicle.

11. The apparatus according to claim 8, wherein the target position comprises at least one of a front bumper, a left front wheel or a right front wheel of the target vehicle.

12. The apparatus according to claim 8, wherein the baffle is made of a soft material.

13. The apparatus according to claim 8, wherein when it is determined that the collision occurs to the target vehicle, the computer program further causes the processor to perform at least one of the following steps:
   sending a brake instruction to a brake system in the target vehicle, and sending a non-acceleration instruction to a throttle in the target vehicle, wherein the brake instruction is used to instruct the target vehicle to brake, or the non-acceleration instruction is used to instruct the throttle to stop refueling.

14. A vehicle, comprising: the apparatus for processing a vehicle collision according to claim 8.

\* \* \* \* \*